US012791525B2

(12) United States Patent
Tan et al.

(10) Patent No.: US 12,791,525 B2
(45) Date of Patent: Nov. 10, 2026

(54) DEVICE AND METHOD FOR DETECTING AND IDENTIFYING SHALLOW-STRATUM FOREIGN OBJECTS BASED ON DISTRIBUTED ACOUSTIC SENSING

(71) Applicant: NANJING UNIVERSITY, Jiangsu (CN)

(72) Inventors: Daoyuan Tan, Jiangsu (CN); Zhenyu Tang, Jiangsu (CN); Honghu Zhu, Jiangsu (CN); Jing Wang, Jiangsu (CN); Dumin Yan, Jiangsu (CN); Wei Zhang, Jiangsu (CN); Bin Shi, Jiangsu (CN); Pei Wang, Jiangxi (CN); Siqi Zhang, Jiangsu (CN)

(73) Assignee: NANJING UNIVERSITY, Jiangsu (CN)

( * ) Notice: Subject to any disclaimer, the term of this patent is extended or adjusted under 35 U.S.C. 154(b) by 413 days.

(21) Appl. No.: 18/592,378

(22) Filed: Feb. 29, 2024

(65) Prior Publication Data

US 2025/0189492 A1 Jun. 12, 2025

Related U.S. Application Data

(63) Continuation of application No. PCT/CN2024/073320, filed on Jan. 19, 2024.

(30) Foreign Application Priority Data

Dec. 12, 2023 (CN) ........................ 202311698400.X

(51) Int. Cl.
*G01N 29/07* (2006.01)
*G01H 9/00* (2006.01)
(Continued)

(52) U.S. Cl.
CPC ............. *G01N 29/07* (2013.01); *G01H 9/004* (2013.01); *G01N 29/0654* (2013.01);
(Continued)

(58) Field of Classification Search
CPC ...... G01N 29/00; G01N 29/04; G01N 29/069; G01N 29/34; G01N 29/07; G01N 29/0654;
(Continued)

(56) References Cited

U.S. PATENT DOCUMENTS

2012/0222487 A1* 9/2012 Hill ...................... G01D 5/3538 385/12
2021/0302609 A1* 9/2021 Bardainne ............. G01V 1/003
(Continued)

FOREIGN PATENT DOCUMENTS

CN 109425451 A * 3/2019 ............... G01L 1/26

*Primary Examiner* — Alexander Satanovsky
*Assistant Examiner* — Matthew W. Baca
(74) *Attorney, Agent, or Firm* — JCIPRNET

(57) ABSTRACT

Disclosed are a device and method for detecting and identifying shallow-stratum foreign objects based on distributed acoustic sensing. The device includes a vibrating sensitivity-enhanced fiber optic cable, a distributed acoustic sensing demodulator, a vibrator system, a vibration data processing unit, a velocity structure inversion unit and an AI-aided locating and identification unit. The distributed acoustic sensing demodulator transmits vibration signals to the vibration data processing unit for preprocessing to obtain waveform signals; the velocity structure inversion unit performs inversion to obtain the shallow-stratum underground velocity structure; positions of shallow-stratum foreign objects are identified through the underground velocity structure and abnormal waveforms; and the types of shallow-stratum foreign objects are identified. A distributed acoustic sensing method for fiber optic cables is used to obtain vibration
(Continued)

signals, velocity imaging is performed on a shallow-stratum velocity structure, and AI is utilized to achieve locating and type identification of shallow-stratum underground foreign objects.

9 Claims, 5 Drawing Sheets

(51) Int. Cl.

| | |
|---|---|
| ***G01N 29/06*** | (2006.01) |
| ***G01N 29/34*** | (2006.01) |
| ***G01N 29/44*** | (2006.01) |
| ***G01N 29/52*** | (2006.01) |

(52) U.S. Cl.
CPC ......... *G01N 29/34* (2013.01); *G01N 29/4481* (2013.01); *G01N 29/52* (2013.01)

(58) Field of Classification Search
CPC ........... G01N 29/2418; G01N 29/4481; G01N 29/44; G01N 29/52; G01N 2291/0422; G01V 2210/62; G01V 2210/622; G01V 2210/6222; G01V 1/226; G01V 1/303; G01V 1/3808; G01V 1/3843; G01V 8/00; G01V 8/24; G01V 11/00; G01V 8/02; G01V 1/003; G01V 1/364; G01V 2210/6161; G01H 9/00; G01H 9/004; G01D 5/353; G01D 5/3537; G01D 5/35374; G01D 5/3538; G02B 1/046; G02B 1/048; G05B 2219/15017; G01S 15/8906; G01S 15/8968
See application file for complete search history.

(56) References Cited

U.S. PATENT DOCUMENTS

| | | | | |
|---|---|---|---|---|
| 2024/0184003 | A1* | 6/2024 | Miller | G01V 1/001 |
| 2025/0277693 | A1* | 9/2025 | Noetzli | G01H 9/006 |

* cited by examiner

DEVICE AND METHOD FOR DETECTING AND IDENTIFYING SHALLOW-STRATUM FOREIGN OBJECTS BASED ON DISTRIBUTED ACOUSTIC SENSING

CROSS-REFERENCE TO RELATED APPLICATION

This application is a continuation of international application of PCT application serial no. PCT/CN2024/073320, filed on Jan. 19, 2024, which claims the priority benefit of China application no. 202311698400.X, filed on Dec. 12, 2023. The entirety of each of the above mentioned patent applications is hereby incorporated by reference herein and made a part of this specification.

TECHNICAL FIELD

The present disclosure relates to the technical field of underground foreign object detection and identification, and particularly relates to a device and method for detecting and identifying shallow-stratum foreign objects based on distributed acoustic sensing.

BACKGROUND

Shallow-stratum underground foreign objects refer to objects or features that exist in underground shallow soil or underground structures and are different from surrounding environments. Such objects or features include rocks, underground wastes, pollutants, water sources and underground pipelines. The shallow-stratum underground foreign objects will affect the stability of buildings, increase costs of engineering construction and environmental protection, undermine underground pipelines and facilities, and bring safety threats to engineering construction. Geophysical methods are usually used for detection of underground foreign objects, and various detection systems currently available need to be improved in detection precision and depth. Therefore, in order to ensure the smooth progress of engineering construction and reduce additional costs and delays, development of methods for detection of shallow-stratum underground foreign objects is of great significance.

At present, methods for detection of underground foreign objects mainly include magnetic detection, electromagnetic detection, geological radar detection and radiometric detection. The magnetic detection is performed based on the effect of underground foreign objects on the geomagnetic field. These foreign objects usually have magnetic properties different from those of surrounding geologic materials. When there exist any foreign objects with magnetic differences, they will distort the surrounding geomagnetic field, thus leading to geomagnetic anomalies. The magnetic detection enables to detect and locate underground foreign objects by measuring the intensity and direction of the geomagnetic field. The principle of electromagnetic detection of underground foreign objects is as follows: due to the response of underground substances to the electromagnetic fields, when electromagnetic waves penetrate through an underground medium, their propagation speed and direction will be affected by the conductivity and permittivity of the medium, and underground foreign objects usually cause changes in electromagnetic parameters, thus resulting in electromagnetic anomalies. By measuring underground propagation characteristics of electromagnetic waves, including the amplitude and phase of the electromagnetic field, as well as frequency response, the electromagnetic detection enables to detect and locate underground foreign objects.

Both the magnetic detection and the electromagnetic detection enable to detect and locate shallow-stratum underground foreign objects somewhat, but also have their respective limitations. The magnetic detection only applies to magnetic foreign objects or geologic bodies that exist underground, and has poor effect in detection of non-magnetic substances. In addition, magnetic data is easily affected by an artificial magnetic field on the ground, and therefore, detection data needs to be corrected. Data interpretation of the electromagnetic detection is relatively complex, distribution of conductivity and permittivity of underground media needs to be considered, and the electromagnetic detection is not suitable for geological environments with high conductivity or permittivity. For the above two methods, an appropriate method should be selected according to specific geological conditions and properties of objects to be detected.

The geological radar detection is a process of detecting underground structures and foreign objects by emitting high-frequency electromagnetic waves and receiving their reflected signals. During operation, the geological radar system emits electromagnetic waves, and the electromagnetic waves penetrate the ground surface and interact with different materials or foreign objects underground. When the electromagnetic waves interact with any underground material interfaces, voids or foreign objects, they will be reflected, refracted and absorbed, and reflected signals will be received and used to generate underground images or profiles. By analyzing the features of reflection signals such as time delay, intensity and frequency, the properties, depth and location of an underground foreign object can be identified. However, the geological radar detection requires point-by-point measurement, and features low efficiency and limited range of detection of large-scale underground areas. In addition, a large amount of complex data is generated during the geological radar detection, thus making it difficult in data processing.

The radiometric detection is a method for detecting underground foreign objects by using rays or particles to penetrate underground media and detecting their attenuation. The rays or particles (such as $\gamma$ rays and neutrons) emitted, when penetrating through different substances underground, are absorbed or scattered, so that a specific energy spectrum or intensity distribution is formed on the ground surface or detector. Through analysis of the interaction between rays/particles and an underground medium, the location, density, composition and other information of an underground foreign object can be determined. Use of radioactive isotopes or particle beams is required for the radiometric detection, thus posing radiation safety hazards, and it is complex in data processing and possibly in interpretation of results. In addition, the radiometric detection is sensitive to specific physical properties of underground media and maybe is ineffective for detection of non-radioactive foreign objects.

In recent years, distributed acoustic sensing technology has been developed rapidly due to its advantages of strong environmental adaptability, resistance to electromagnetic interference, convenience of installation, and high acquisition density, and has been widely used in the fields of geodesic survey such as seismic monitoring, oil-gas exploration and pipeline intrusion. Conventional methods for detecting underground foreign objects generally have defects such as low resolution, weak environmental adaptability, complex data processing, and failure to accurately locate shallow-stratum foreign objects and identify their types.

Therefore, those skilled in the art are in an urgent need to identify types of shallow-stratum underground foreign objects, to improve the accuracy and capability of locating and identifying shallow-stratum underground foreign objects, and to reduce potential geologic risks.

SUMMARY

Invention objective: in view of problems existing in the prior art, the present disclosure provides a device and method for detecting and identifying shallow-stratum foreign objects based on distributed acoustic sensing. For detection of shallow-stratum underground foreign objects in geological engineering, a vibrating sensitivity-enhanced fiber optic cable is pre-buried in the shallow stratum, active vibrator signals are transmitted through a vibrator system, a distributed acoustic sensing method for fiber optic cables (high sensitivity, high precision and high spatial resolution) is used to obtain vibration signals for detection, and velocity imaging is performed on a shallow-stratum velocity structure along the fiber optic cable. The method improves the accuracy and resolution of shallow-stratum foreign object detection, and in combination with AI, achieves the locating and type identification of shallow-stratum underground foreign objects.

Technical solution: a device for detecting and identifying shallow-stratum foreign objects based on distributed acoustic sensing of the present disclosure includes a vibrating sensitivity-enhanced fiber optic cable, a distributed acoustic sensing demodulator, a vibrator system, a vibration data processing unit, a velocity structure inversion unit and an AI-aided locating and identification unit, where the vibrating sensitivity-enhanced fiber optic cable is provided with a fiber core, the fiber core is wrapped by a vibrating sensitivity-enhanced cladding, vibrating low-loss Bingham body filling gel is filled between the vibrating sensitivity-enhanced cladding and a jacket, and cable-soil coupling-enhanced fins are additionally arranged on the jacket; and the vibrating sensitivity-enhanced fiber optic cable is connected to the distributed acoustic sensing demodulator; vibration data of the fiber optic cable is acquired through the distributed acoustic sensing demodulator and transmitted to the vibration data processing unit; the vibration data processing unit is connected to the velocity structure inversion unit; and the AI-aided locating and identification unit is connected to the vibration data processing unit and the velocity structure inversion unit.

A method for detecting and identifying shallow-stratum foreign objects based on distributed acoustic sensing of the present disclosure includes the following steps:

(1) wrapping the vibrating sensitivity-enhanced cladding outside the fiber core, filling the vibrating low-loss Bingham body filling gel between the vibrating sensitivity-enhanced cladding and the jacket, and additionally arranging cable-soil coupling-enhanced fins on the jacket, to make the vibrating sensitivity-enhanced fiber optic cable;

(2) shallowly burying the vibrating sensitivity-enhanced fiber optic cable in a shallow-stratum detection area, and inspecting circuit integrity and cable-soil coupling of the vibrating sensitivity-enhanced fiber optic cable;

(3) connecting the vibrating sensitivity-enhanced fiber optic cable to the distributed acoustic sensing demodulator, and setting sampling parameters of the distributed acoustic sensing demodulator;

(4) transmitting active vibrator signals through the vibrator system, and acquiring vibration data of the vibrating sensitivity-enhanced fiber optic cable in a set time period through the distributed acoustic sensing demodulator;

(5) transmitting the vibration data acquired through the distributed acoustic sensing demodulator to the vibration data processing unit, preprocessing the vibration data through the vibration data processing unit, displaying waveform changes of the vibration signals in the fiber optic cable over time, and identifying the fiber optic cable channel where a shallow-stratum foreign object is located according to abnormal waveforms, so that a plane position of the underground foreign object is determined;

(6) transmitting the preprocessed vibration signals to the velocity structure inversion unit through the vibration data processing unit, performing inversion of a shallow-stratum underground velocity structure to obtain the shallow-stratum underground velocity structure of the detection area, and analyzing a ground depth of the shallow-stratum foreign object according to an abnormal shear wave velocity, so as to determine three-dimensional coordinates of the shallow-stratum foreign object; and (7) receiving data images from the vibration data processing unit and the velocity structure inversion unit through the AI-aided locating and identification unit, denoising the data images through a shallow-stratum foreign object image denoising method, performing binary semantic segmentation on the generated denoised images, and separating the shallow-stratum foreign object along its boundary according to the background of the denoised images; by use of a deep learning algorithm, training the deep learning model for target detection according to contours and elastic wave response characteristics of different shallow-stratum foreign objects, and identifying types of the shallow-stratum foreign objects in segmented images.

In the step (1), when additionally arranging cable-soil coupling-enhanced fins on the jacket, a type of and a spacing between the cable-soil coupling-enhanced fins are determined based on the unique soil medium and soil density of a detection area.

In the step (6), the velocity structure inversion unit, according to vibration signals of the vibration data processing unit, performs inversion of the shallow-stratum underground velocity structure through a full waveform imaging method belonging to spectral element methods, to obtain the shallow-stratum underground velocity structure of the detection area.

In the step (6), the vibration data processing unit transmits the preprocessed vibration signals to a velocity structure inversion unit, an intermediate channel of the fiber optic cable is used as a virtual source, cross-correlation calculation is sequentially performed for the channels in the areas where abnormal waveforms exist, the cross-correlation results are superimposed by using a phase-weighted superposition method to obtain a function of cross correlation between the detection areas; distributed acoustic sensing data acquired is more accurate than phase data, a phase shift method is used to extract surface-wave dispersion curves of an underground structure of detection area, then according to relevant information of the detection area, a random sampling algorithm based on the Monte Carlo method is used to invert an underground velocity structure of an abnormal detection area after multiple iterations.

In the step (7), the AI-aided locating and identification unit uses the bilateral filtering method to filter noisy images in underground foreign object waveform velocity images captured by the vibration data processing unit and the velocity structure inversion unit, thereby suppressing the interference of image noise on detection of shallow-stratum foreign object targets and boundary identification; and denoised images are annotated along edges of shallow-stratum foreign objects in the images using a LabelMe tool to obtain a label graph, thereby establishing an image detection dataset and a semantic segmentation dataset.

In the step (7), the AI-aided locating and identification unit detects the shallow-stratum foreign object targets in images by using a YOLO-V4 deep learning network and the established image detection dataset and the semantic segmentation dataset, and the constructed deep learning model for target detection is AI, achieves trained by inputting velocity structures and imaging features of different types of shallow-stratum foreign objects, so that the types of shallow-stratum foreign objects are identified.

In the step (7), accurate identification of types of shallow-stratum foreign objects in segmented images is achieved through methods of image denoising based on AI-aided underground structure surface wave imaging, semantic segmentation and accurate identification of types of shallow-stratum foreign objects.

In the step (1), the material of the vibrating sensitivity-enhanced cladding is determined based on a used fiber optic cable material and a material doped with soil media and density characteristics.

In the step (4), active vibrator signals are excited through a vibrator excitation system of rare earth giant magnetostrictive materials.

Working principle: in the present disclosure, a distributed vibrating sensitivity-enhanced fiber optic cable containing the vibrating low-loss Bingham body filling gel and the vibrating sensitivity-enhanced cladding is adopted, and cable-soil coupling-enhanced fins are additionally arranged on a surface of the vibrating sensitivity-enhanced fiber optic cable at a certain spacing, which a perceptual effect of the fiber optic cable on underground vibration signals. The present disclosure studies a vibration mechanism for the fiber optic cable, different soil bodies and foreign objects of different sizes, achieves high-resolution inversion, and by use of the deep learning algorithm, achieves identification of types of the shallow-stratum foreign objects in the segmented images.

Compared with the prior art, the present disclosure has the following advantages and beneficial effects:

(1) In the present disclosure, the vibrating sensitivity-enhanced fiber optic cable is combined with the distributed acoustic sensing method for fiber optic cables, and the vibrating low-loss Bingham body filling gel and the vibrating sensitivity-enhanced cladding are added, thereby significantly improving the measurement sensitivity of the distributed acoustic sensing method for fiber optic cables, further obtaining the characteristics of surface soil bodies within a range of vibration signals from the active vibrator to the fiber optic cable more accurately, and improving the accuracy of locating and identifying shallow-stratum underground foreign objects.

(2) In the present disclosure, the high-frequency and high-power vibrator excitation system of rare earth giant magnetostrictive materials is adopted, the full waveform imaging method belonging to spectral element methods is used for imaging the underground three-dimensional velocity structures along the fiber optic cable, and higher-resolution accurate underground structure information is obtained, so that shallow-stratum underground foreign objects are located.

(3) In the present disclosure, identification of types of shallow-stratum foreign objects in segmented images is achieved through methods of image denoising based on AI-aided underground structure surface wave imaging, semantic segmentation and accurate identification of types of shallow-stratum foreign objects, thus providing more accurate information and safety assurance for ground construction projects and shallow-stratum safety.

(4) The present disclosure, by combining an AI algorithm and adopting image denoising and target segmentation methods, achieves the identification of types of shallow-stratum underground foreign objects, improves the accuracy and capability of locating and identifying shallow-stratum underground foreign objects, achieves efficient exploration and management of geological resources, reduces potential geologic risks, and ensures the safety and feasibility of geological engineering design.

DESCRIPTION OF THE EMBODIMENTS

Figure 1:
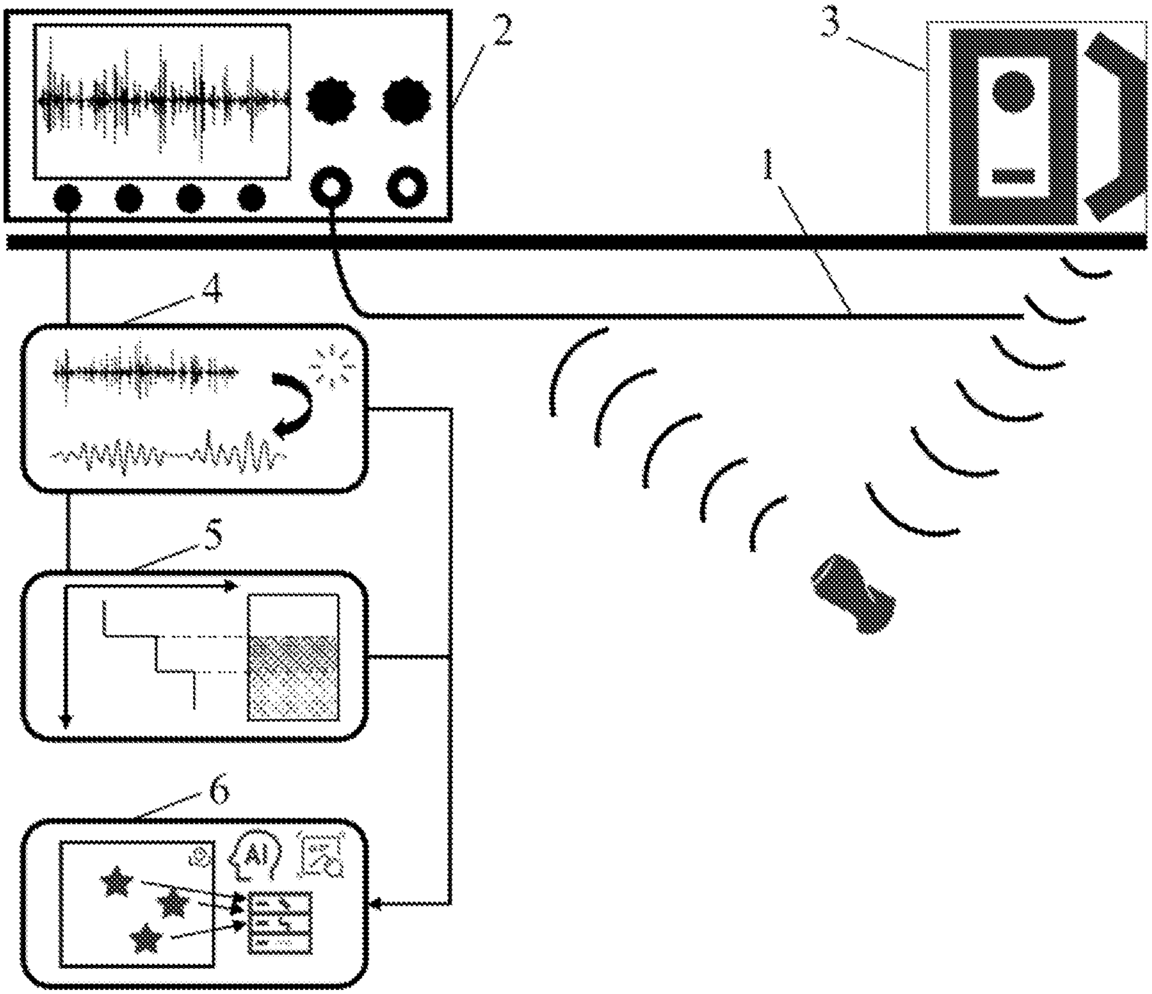
FIG. 1 is a schematic diagram of a structure of a device for detecting and identifying shallow-stratum foreign objects based on distributed acoustic sensing of the present disclosure.

As shown in FIG. 1, a device for detecting and identifying shallow-stratum foreign objects based on distributed acoustic sensing of the present disclosure includes a vibrating sensitivity-enhanced fiber optic cable 1, a distributed acoustic sensing demodulator 2, a vibrator system 3, a vibration data processing unit 4, a velocity structure inversion unit 5 and an AI-aided locating and identification unit 6, where the vibrator system 3 is a vibrator excitation system, and the velocity structure inversion unit 5 is a high-resolution velocity structure inversion unit.

The vibrating sensitivity-enhanced fiber optic cable 1 is provided with a fiber core 1-1, the fiber core 1-1 is wrapped by a vibrating sensitivity-enhanced cladding 1-2, vibrating low-loss Bingham body filling gel 1-3 is filled between the vibrating sensitivity-enhanced cladding 1-2 and a jacket 1-4, and cable-soil coupling-enhanced fins 1-5 are additionally arranged on the jacket 1-4 of the vibrating sensitivity-enhanced fiber optic cable 1, to enhance vibration sensitivity of a sensing fiber optic cable and also cable-soil coupling.

The vibrating sensitivity-enhanced fiber optic cable 1 is connected to the distributed acoustic sensing demodulator 2. Vibration data of the fiber optic cable is acquired through the distributed acoustic sensing demodulator 2 and transmitted to the vibration data processing unit 4, the vibration data is preprocessed based on vibration signals collected by the distributed acoustic sensing demodulator 2 to remove electromagnetic interference of relevant instruments, and an underground foreign object waveform is selected according to a waveform mutation method to determine an orientation. The vibration data processing unit 4 is connected to the velocity structure inversion unit 5, a preprocessed waveform signal is used to invert an underground velocity structure, and based on similarity of wave velocities in the same underground medium, abnormal wave velocities caused by foreign objects are distinguished, so as to achieve locating of underground foreign objects. The AI-aided locating and identification unit 6 is connected to the vibration data processing unit 4 and the velocity structure inversion unit 5. A bilateral filtering method is used to filter noise in an obtained image of underground foreign object waveform velocities, and a deep learning model for target detection is trained based on velocity structures and imaging features of different types of shallow-stratum foreign objects. That is, accurate identification of types of shallow-stratum foreign objects is achieved through methods of image denoising based on AI-aided underground structure surface wave imaging, semantic segmentation and accurate identification of types of shallow-stratum foreign objects.

A method for detecting and identifying shallow-stratum foreign objects based on distributed acoustic sensing of the present disclosure includes the following steps:

(1) using the vibrating sensitivity-enhanced cladding 1-2 as a fiber optic cable cladding, wrapping the vibrating sensitivity-enhanced cladding 1-2 outside the fiber core 1, filling the vibrating low-loss Bingham body filling gel 1-3 between the fiber core 1-1 and the jacket 1-4 of the sensing fiber optic cable, and additionally arranging the cable-soil coupling-enhanced fins 1-5 on the fiber optic cable at a set spacing, to enhance the capability of the fiber optic cable to withstand vibration and make the vibrating sensitivity-enhanced fiber optic cable 1;

(2) slotting and shallowly burying the vibrating sensitivity-enhanced fiber optic cable 1 in a shallow-stratum detection area, and simultaneously inspecting circuit integrity and cable-soil coupling of the vibrating sensitivity-enhanced fiber optic cable 1;

(3) connecting the vibrating sensitivity-enhanced fiber optic cable 1 to the distributed acoustic sensing demodulator 2, inspecting whether a fiber optic cable channel is unobstructed, and setting sampling parameters of the distributed acoustic sensing demodulator 2;

(4) transmitting active vibrator signals through the vibrator system 3, and acquiring vibration data of the vibrating sensitivity-enhanced fiber optic cable 1 in a set time period through the distributed acoustic sensing demodulator 2;

(5) transmitting the vibration data acquired through the distributed acoustic sensing demodulator 2 to the vibration data processing unit 4; preprocessing the vibration data through the vibration data processing unit, displaying waveform changes of the vibration signals in the fiber optic cable over time, and identifying the fiber optic cable channel where a shallow-stratum foreign object is located according to abnormal waveforms, so that a plane position of the underground foreign object is determined;

(6) transmitting the preprocessed vibration signals to the velocity structure inversion unit 5 through the vibration data processing unit 4, performing inversion of a shallow-stratum underground velocity structure to obtain the shallow-stratum underground velocity structure of the detection area, and analyzing a ground depth of the shallow-stratum foreign object according to an abnormal shear wave velocity, so as to determine three-dimensional coordinates of the shallow-stratum foreign object; and (7) receiving data images from the vibration data processing unit 4 and the velocity structure inversion unit 5 through the AI-aided locating and identification unit 6, denoising the data images through a shallow-stratum foreign object image denoising method, performing binary semantic segmentation on the generated denoised images, and separating the shallow-stratum foreign object along its boundary according to the background of the denoised images; by use of a deep learning algorithm, training the deep learning model for target detection according to contours and elastic wave response characteristics of different shallow-stratum foreign objects, and identifying types of the shallow-stratum foreign objects in segmented images.

In the step (1), the vibrating low-loss Bingham body filling gel 1-3 is filled between the fiber core and the cable jacket, which not only protects the fiber optic cable from damage due to large strain, but also transmits small-strain vibration strain.

In the step (1), the material of the vibrating sensitivity-enhanced cladding is determined based on a used fiber optic cable material and a material doped with soil media and density characteristics.

In the step (1), a type of and a spacing between the cable-soil coupling-enhanced fins are determined based on the unique soil medium and soil density of a detection area, and a contact area between the fiber optic cable and surrounding soil bodies is enlarged to enhance the cable-soil coupling and improve efficiency of micro-vibration sensing.

In the step (2), in this embodiment, the vibrating sensitivity-enhanced fiber optic cable 1 is buried at a depth of 0.2 m underground, during laying of the fiber optic cable, circuit integrity of the fiber optic cable is inspected, and backfill quality is ensured to guarantee the cable-soil coupling between the fiber optic cable and the soil body.

In the step (3), connection between the vibrating sensitivity-enhanced fiber optic cable and the through the distributed acoustic sensing demodulator is checked and ensured, and a demodulator channel spacing, a sampling frequency and other related parameters are designed based on a detection range and depth of the detection area.

In the step (4), active vibrator signals are excited through the vibrator excitation system of rare earth giant magnetostrictive materials, and relevant levels of vibrator signals are excited based on the detection area.

In the step (5), the acquired vibration data is preprocessed by the vibration data processing unit, waveform changes of the vibration signals at various positions of the fiber optic cable over time are displayed, and the fiber optic cable channel where abnormal waveforms are located is located, so that a plane position of the underground foreign object is determined.

In the step (6), the velocity structure inversion unit, according to vibration signals of the vibration data processing unit, performs inversion of the shallow-stratum underground velocity structure through a full waveform imaging method belonging to spectral element methods, to obtain the shallow-stratum underground velocity structure of the detection area. Due to a consistent propagation speed of waves in a homogeneous medium uniform medium, when a vibration wave propagates through an underground foreign object, the underground velocity structure of the area where the foreign object is located will be changed, so that the velocity of the abnormal underground foreign object can be identified to determine the depth of the underground foreign object and further determine the three-dimensional coordinates of the shallow-stratum foreign object.

In the step (7), the AI-aided locating and identification unit uses the bilateral filtering method to filter noisy images in underground foreign object waveform velocity images captured by the vibration data processing unit and the velocity structure inversion unit, thereby suppressing the interference of image noise on detection of shallow-stratum foreign object targets and boundary identification. Denoised images are annotated along edges of shallow-stratum foreign objects in the images using a LabelMe tool to obtain a label graph, thereby establishing an image detection dataset and a semantic segmentation dataset.

In the step (7), the AI-aided locating and identification unit detects the shallow-stratum foreign object targets in images by using a YOLO-V4 deep learning network and the established image detection dataset and the semantic segmentation dataset, and a deep learning model is trained by inputting velocity structures and imaging features of different types of shallow-stratum foreign objects, so that the types of shallow-stratum foreign objects are identified.

EMBODIMENT

A device and method for detecting and identifying shallow-stratum foreign objects based on distributed acoustic sensing of the present disclosure are used to position and identify shallow-stratum foreign objects in a certain test site. An underground soil structure of the test site is as follows: muddy soil 0-2 m underground, sandy soil 2-5 m underground, clay 5-11 m underground, with an underground water layer, and clay rocks 11 m underground.

Figure 2:
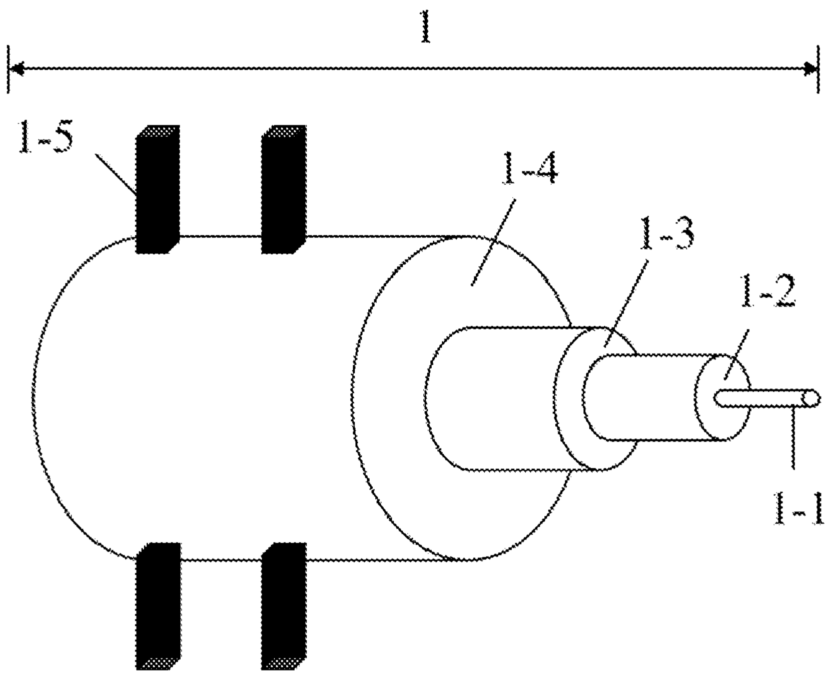
FIG. 2 is a schematic diagram of a structure of a vibrating sensitivity-enhanced fiber optic cable of the present disclosure.

A method for detecting and identifying shallow-stratum foreign objects based on distributed acoustic sensing of the present disclosure includes the following steps:

1) As shown in FIG. 2, vibrating low-loss Bingham body filling gel 1-3 is filled between a fiber core and a jacket of a traditional sensing fiber optic cable, a vibrating sensitivity-enhanced cladding 1-2 is wrapped outside the fiber core, so that small-strain vibration strain is transmitted, and cable-soil coupling-enhanced fins 1-5 are additionally arranged on the fiber optic cable at a spacing of 1 m, to enhance the cable-soil coupling, so as to improve a perceptual gain effect of the fiber optic cable on underground vibration signals;

(2) the vibrating sensitivity-enhanced fiber optic cable 1, with a total length of 3 km, is slotted and buried at a depth of 0.2 m in a rectangular detection area 800 m long and 700 m wide, circuit integrity of the fiber optic cable is inspected after laying of the fiber optic cable, and backfill quality is ensured to guarantee the cable-soil coupling between the fiber optic cable and a soil body.

Figure 3:
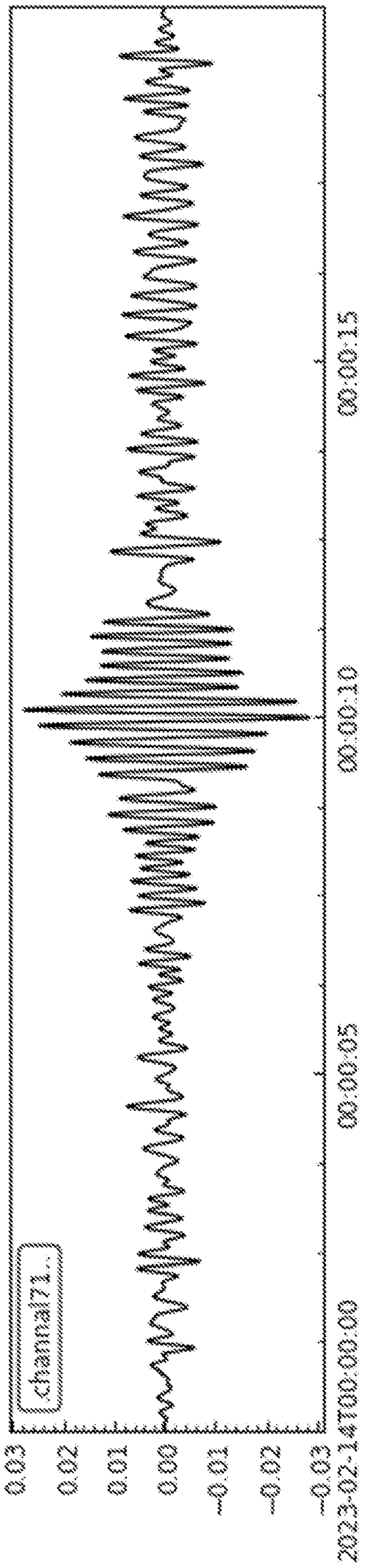
FIG. 3 shows waveform changes of underground foreign objects detected by the present disclosure.
Figure 4:
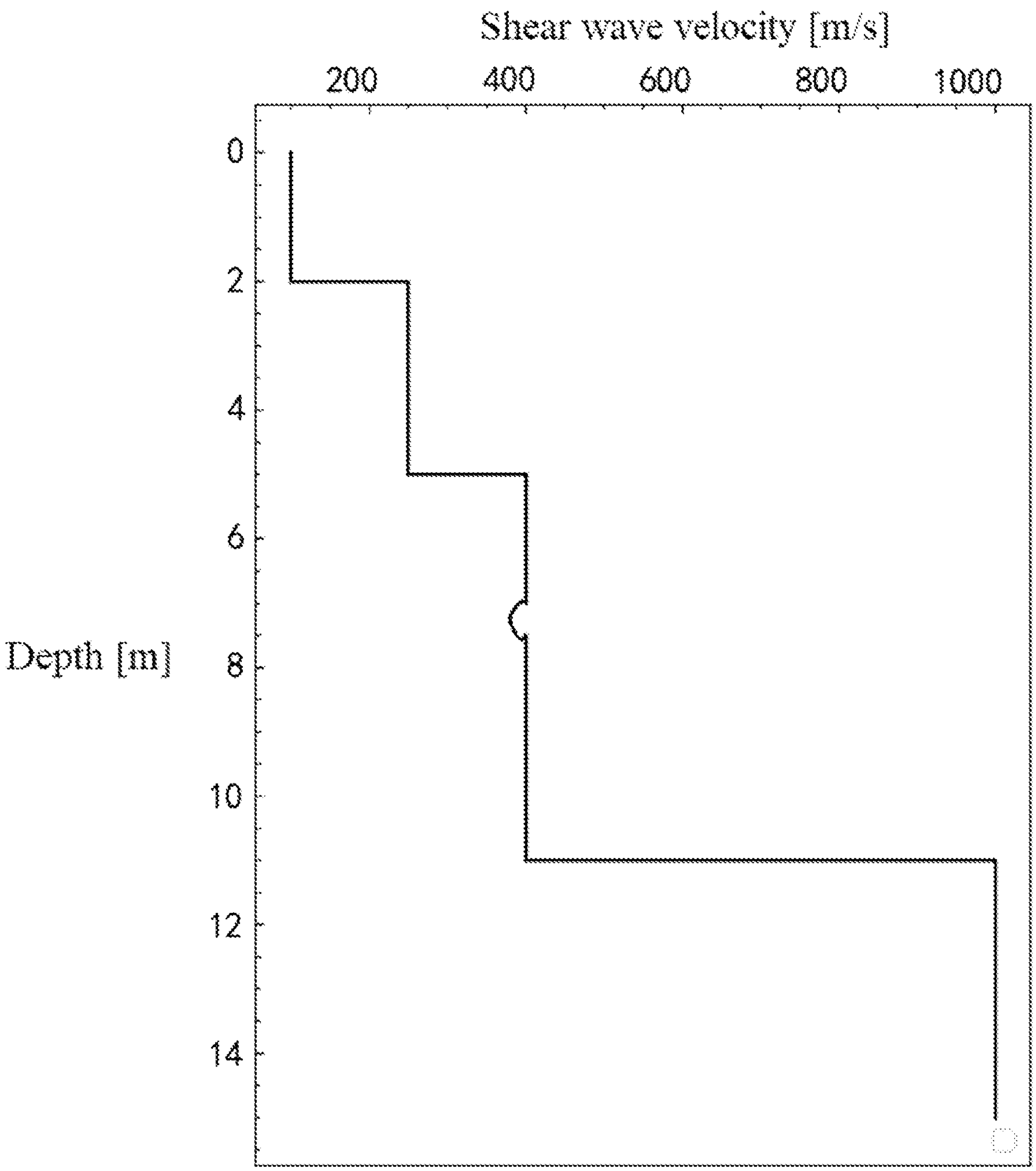
FIG. 4 shows abnormal underground velocities of shallow-stratum foreign objects detected by the present disclosure.

(3) the vibrating sensitivity-enhanced fiber optic cable 1 is connected to the through the distributed acoustic sensing demodulator 2, whether a fiber optic cable channel is unobstructed in inspected, and a sampling frequency, a channel spacing and the number of channels of the demodulator are set as 100 Hz, 5 m and 600 respectively;

(4) active vibrator signals are transmitted through a vibrator excitation system of rare earth giant magnetostrictive materials, and vibration data of the fiber optic cable is acquired through the distributed acoustic sensing demodulator for 24 h;

(5) the distributed acoustic sensing demodulator transmits the acquired vibration data to a vibration data processing unit for preprocessing and waveform extraction, and according to a position of an abnormal waveform display channel, as shown in FIG. 3, it is determined that the underground foreign object is located below a plane position of a channel 71, that is, the underground foreign object is on a lower part 355 m away from an end of the fiber optic cable;

(6) the vibration data processing unit 4 transmits the preprocessed vibration signals to a velocity structure inversion unit, an intermediate channel of the fiber optic cable is used as a virtual source, cross-correlation calculation is sequentially performed for the channels in the areas where abnormal waveforms exist, the cross-correlation results are superimposed by using a phase-weighted superposition method to obtain a function of cross correlation between the detection areas; distributed acoustic sensing data acquired is more accurate than phase data, a phase shift method is used to extract surface-wave dispersion curves of an underground structure of detection area, then according to relevant information of the detection area, a random sampling algorithm based on the Monte Carlo method is used to invert an underground velocity structure of an abnormal detection area after multiple iterations; and as shown in FIG. 4, the underground velocity becomes abnormally low at a depth of 7 m-7.5 m from the ground surface, indicating the presence of underground foreign objects at this depth.

Figure 5:
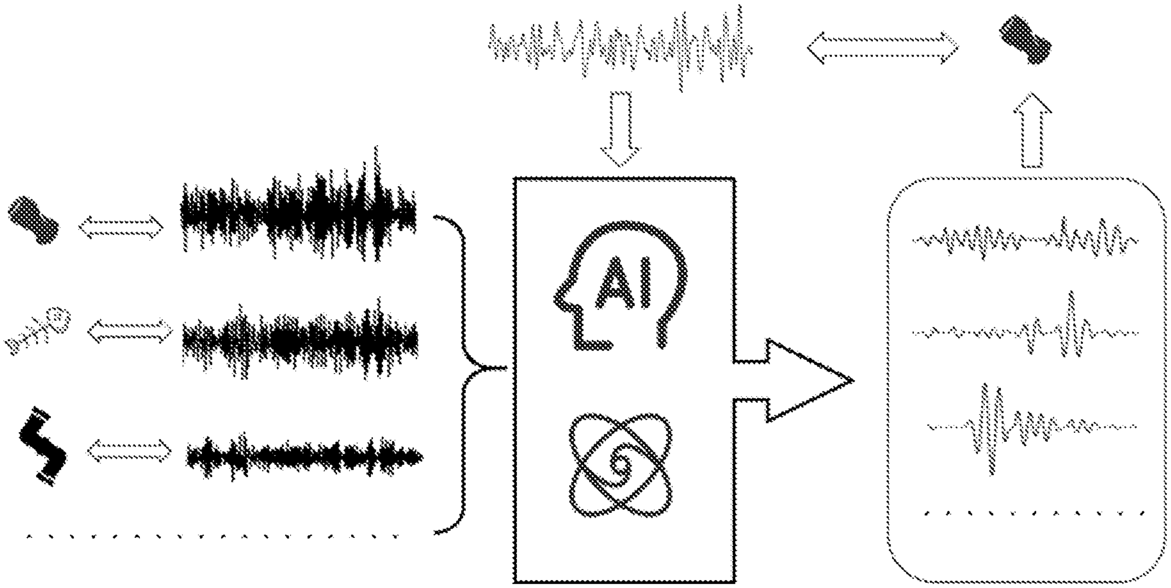
FIG. 5 is a diagram of learning and identification of foreign object waveforms by an AI-aided locating and identification unit of the present disclosure.

(7) data images from the vibration data processing unit 4 and the velocity structure inversion unit 5 are received by the AI-aided locating and identification unit 6, as shown in FIG. 5, based on a shallow-stratum foreign object image denoising method of an AI algorithm, binary semantic segmentation on the generated denoised images is performed, and the shallow-stratum foreign object is separated along its boundary according to the background of the denoised images; by use of a deep learning algorithm, the deep learning model for target detection is trained according to contours and elastic wave response characteristics of different shallow-stratum foreign objects, and types of the shallow-stratum foreign objects in segmented images are identified.

A plane position of a foreign object is determined based on plane abnormal waveforms obtained by the vibration data processing unit, and a burial depth of the underground foreign object is determined through the velocity structure inversion unit, so as to determine three-dimensional coordinates of the shallow-stratum underground foreign object; by use of a deep learning algorithm, the deep learning model for target detection is trained according to contours and elastic wave response characteristics of different shallow-stratum foreign objects, and then data captured through the vibration data processing unit and velocity structure inversion unit is used to determine, so that the types of shallow-stratum underground foreign objects are identified.

What is claimed is:

1. A method for detecting and identifying shallow-stratum foreign objects based on distributed acoustic sensing, implemented by a device for detecting and identifying shallow-stratum foreign objects based on distributed acoustic sensing, wherein the device comprises a vibration sensitivity-enhanced fiber optic cable, a distributed acoustic sensing demodulator, a vibrator system, a vibration data processing unit, a velocity structure inversion unit and an Artificial Intelligence (AI)-aided locating and identification unit, wherein the vibration sensitivity-enhanced fiber optic cable is provided with a fiber core, the fiber core is wrapped by a vibration sensitivity-enhanced cladding, a vibrating low-loss Bingham body filling gel is filled between the vibration sensitivity-enhanced cladding and a jacket, and cable-soil coupling-enhanced fins are additionally arranged on the jacket; and the vibration sensitivity-enhanced fiber optic cable is connected to the distributed acoustic sensing demodulator; vibration data of the fiber optic cable is acquired through the distributed acoustic sensing demodulator and transmitted to the vibration data processing unit; the vibration data processing unit is connected to the velocity structure inversion unit; and the AI-aided locating and identification unit is connected to the vibration data processing unit and the velocity structure inversion unit, wherein the method comprises following steps:

(1) wrapping the vibration sensitivity-enhanced cladding outside the fiber core, filling the vibrating low-loss Bingham body filling gel between the vibration sensitivity-enhanced cladding and the jacket, and additionally arranging the cable-soil coupling-enhanced fins on the jacket, to make the vibration sensitivity-enhanced fiber optic cable;

(2) shallowly burying the vibration sensitivity-enhanced fiber optic cable in a shallow-stratum detection area, and inspecting circuit integrity and cable-soil coupling of the vibration sensitivity-enhanced fiber optic cable;

(3) connecting the vibration sensitivity-enhanced fiber optic cable to the distributed acoustic sensing demodulator, and setting sampling parameters of the distributed acoustic sensing demodulator;

(4) transmitting active vibrator signals through the vibrator system, and acquiring vibration data of the vibration sensitivity-enhanced fiber optic cable in a set time period through the distributed acoustic sensing demodulator;

(5) transmitting the vibration data acquired through the distributed acoustic sensing demodulator to the vibration data processing unit, preprocessing the vibration data through the vibration data processing unit, displaying waveform changes of vibration signals in the fiber optic cable over time, and identifying a fiber optic cable channel where a shallow-stratum foreign object is located according to abnormal waveforms, so that a plane position of an underground foreign object is determined;

(6) transmitting the preprocessed vibration signals to the velocity structure inversion unit through the vibration data processing unit, performing inversion of a shallow-stratum underground velocity structure to obtain a shallow-stratum underground velocity structure of the detection area, and analyzing a ground depth of the shallow-stratum foreign object according to an abnormal shear wave velocity, so as to determine three-dimensional coordinates of the shallow-stratum foreign object; and (7) receiving data images from the vibration data processing unit and the velocity structure inversion unit through the AI-aided locating and identification unit, denoising the data images through a shallow-stratum foreign object image denoising method, performing binary semantic segmentation on the generated denoised images, and separating the shallow-stratum foreign object along its boundary according to a background of the denoised images; by use of a deep learning algorithm, training a deep learning model for target detection according to contours and elastic wave response characteristics of different shallow-stratum foreign objects, and identifying types of the shallow-stratum foreign objects in segmented images.

2. The method for detecting and identifying shallow-stratum foreign objects based on distributed acoustic sensing according to claim 1, wherein in the step (1), when additionally arranging the cable-soil coupling-enhanced fins on the jacket, a type and a spacing between the cable-soil coupling-enhanced fins are determined based on an unique soil medium and soil density of the detection area.

3. The method for detecting and identifying shallow-stratum foreign objects based on distributed acoustic sensing according to claim 1, wherein in the step (6), the velocity structure inversion unit, according to the vibration signals of the vibration data processing unit, performs the inversion of the shallow-stratum underground velocity structure through a full waveform imaging method belonging to spectral element methods, to obtain the shallow-stratum underground velocity structure of the detection area.

4. The method for detecting and identifying shallow-stratum foreign objects based on distributed acoustic sensing according to claim 1, wherein in the step (6), the vibration data processing unit transmits the preprocessed vibration signals to the velocity structure inversion unit, an intermediate channel of the fiber optic cable is used as a virtual source, a cross-correlation calculation is performed for the channels in areas where the abnormal waveforms exist, cross-correlation results are superimposed by using a phase-weighted superposition method to obtain a function of cross correlation between the detection areas; and a phase shift method is used to extract surface-wave dispersion curves of an underground structure of the detection area, and a random sampling algorithm based on a Monte Carlo method is used to invert an underground velocity structure of an abnormal detection area after multiple iterations.

5. The method for detecting and identifying shallow-stratum foreign objects based on distributed acoustic sensing according to claim 1, wherein in the step (7), the AI-aided locating and identification unit uses a bilateral filtering method to filter noisy images in underground foreign object waveform velocity images captured by the vibration data processing unit and the velocity structure inversion unit, thereby suppressing an interference of an image noise on detection of shallow-stratum foreign object targets and boundary identification; and denoised images are annotated along edges of shallow-stratum foreign objects in the images using a LabelMe tool to obtain a label graph, thereby establishing an image detection dataset and a semantic segmentation dataset.

6. The method for detecting and identifying shallow-stratum foreign objects based on distributed acoustic sensing according to claim 5, wherein in the step (7), the AI-aided locating and identification unit detects the shallow-stratum foreign object targets in images by using a YOLO-V4 deep learning network and the established image detection dataset and the semantic segmentation dataset, and the deep learning model for target detection is trained by inputting velocity structures and imaging features of different types of the shallow-stratum foreign objects, so that the types of the shallow-stratum foreign objects are identified.

7. The method for detecting and identifying shallow-stratum foreign objects based on distributed acoustic sensing according to claim 1, wherein in the step (7), accurate identification of types of the shallow-stratum foreign objects in segmented images is achieved through methods of image denoising based on AI-aided underground structure surface wave imaging, semantic segmentation and accurate identification of types of shallow-stratum foreign objects.

8. The method for detecting and identifying shallow-stratum foreign objects based on distributed acoustic sensing according to claim 1, wherein in the step (1), a material of the vibration sensitivity-enhanced cladding is determined based on a used fiber optic cable material and a material doped with soil media and density characteristics.

9. The method for detecting and identifying shallow-stratum foreign objects based on distributed acoustic sensing according to claim 1, wherein in the step (4), active vibrator signals are excited through a vibrator excitation system of rare earth giant magnetostrictive materials.

* * * * *